US012295536B2

(12) United States Patent
Benedict

(10) Patent No.: US 12,295,536 B2
(45) Date of Patent: May 13, 2025

(54) CLEANING DEVICE FOR ATHLETIC SHOE CLEATS AND SPIKES

(71) Applicant: Jeanette Christine Benedict, Rancho Palos Verdes, CA (US)

(72) Inventor: Jeanette Christine Benedict, Rancho Palos Verdes, CA (US)

( * ) Notice: Subject to any disclaimer, the term of this patent is extended or adjusted under 35 U.S.C. 154(b) by 200 days.

(21) Appl. No.: 15/929,622

(22) Filed: May 13, 2020

(65) Prior Publication Data

US 2021/0353127 A1 Nov. 18, 2021

(51) Int. Cl.
*A47L 23/04* (2006.01)
*B08B 1/00* (2024.01)
*B08B 1/16* (2024.01)

(52) U.S. Cl.
CPC .............. *A47L 23/04* (2013.01); *B08B 1/165* (2024.01)

(58) Field of Classification Search
CPC .......... A47L 23/04; A47L 13/02; A47L 13/08; B08B 1/005; B08B 1/165; B08B 1/16; A63B 57/60; A46B 15/0081
USPC ..... 15/236.1, 113, 111, 237, 236.01, 236.05, 15/236.08, 236.09, 112
See application file for complete search history.

(56) References Cited

U.S. PATENT DOCUMENTS 3,050,760 A * 8/1962 Darnell ................... A47L 23/04 15/160
3,089,172 A * 5/1963 Walden ................... A47L 23/04 15/237
4,040,390 A * 8/1977 Rosenbaum ......... A01K 13/002 15/236.08
D285,131 S * 8/1986 Wilkeson ..................... D30/158
6,256,830 B1 7/2001 Jolly
6,302,269 B1 * 10/2001 Risch ...................... A47L 23/04 206/466
6,553,603 B1 * 4/2003 Jolly ...................... A63B 57/60 280/DIG. 6
7,437,793 B2 10/2008 Lane
D592,857 S 5/2009 Bohannon
D641,171 S * 7/2011 Mor ............................... D4/130
8,096,012 B2 * 1/2012 Lubart .................... A47L 23/24 15/236.08
8,595,887 B2 * 12/2013 Hiltmann ............. A01K 13/002 15/186

(Continued)

*Primary Examiner* — Marc Carlson
(74) *Attorney, Agent, or Firm* — LANDMARK INTELLECTUAL PROPERTY LAW, LLC; Gregory M Murphy

(57) ABSTRACT

One embodiment of a palm-held device for cleaning field debris off the underside of athletic shoes which have cleats or spikes, comprises a handle (10) connected via a neck (12) to a cleaning platform (14) below. There is a plurality of cleaning pegs (18) protruding orthogonally from the base (16) of the cleaning platform (14). Additional cleaning elements that may extend outward from the cleaning platform (14) include a straight scraper (20) and a serrated scraper (22). The device may be fabricated from a variety of materials, with the preferred materials being fairly-high strength engineering polymeric materials, with or without fiber reinforced composites. The device may be made fabricated by injection molding and could be done as one piece or multiple pieces that were then fused together. It may also be fabricated using additive manufacturing. Other embodiments are described.

7 Claims, 3 Drawing Sheets

(56) References Cited

U.S. PATENT DOCUMENTS

| | | | | | |
|---|---|---|---|---|---|
| 8,850,649 | B2 * | 10/2014 | Tuman | A47L 13/00 15/104.001 |
| 9,750,385 | B2 * | 9/2017 | Curtis | A46B 5/021 |
| D814,727 | S | 4/2018 | Wehrlie | |
| 10,573,640 | B2 | 3/2020 | Cohens | |
| 10,687,689 | B1 * | 6/2020 | Antonucci | A47L 23/04 |
| D903,955 | S * | 12/2020 | Singer | D30/159 |
| D925,924 | S * | 7/2021 | Kanakis | D4/128 |
| D940,969 | S * | 1/2022 | Maor | D30/158 |
| D955,043 | S * | 6/2022 | Zhu | D28/35 |
| D982,326 | S * | 4/2023 | Russo | D4/130 |
| D1,001,511 | S * | 10/2023 | Hinds | D4/127 |
| 11,849,835 | B2 * | 12/2023 | Harrington | A46B 15/0046 |
| D1,013,390 | S * | 2/2024 | Russo | D4/127 |
| D1,014,845 | S * | 2/2024 | Du | D28/63 |
| 2013/0232708 | A1 * | 9/2013 | Mor | A46B 9/023 15/160 |
| 2015/0272308 | A1 * | 10/2015 | Harrington | A46B 9/06 15/105 |
| 2017/0367923 | A1 * | 12/2017 | Bergbacka | A01K 13/00 |
| 2018/0064066 | A1 * | 3/2018 | Lou | A01K 13/00 |
| 2022/0211004 | A1 * | 7/2022 | Park | A46B 5/021 |
| 2024/0408617 | A1 * | 12/2024 | Schlumm | B08B 1/165 |

* cited by examiner

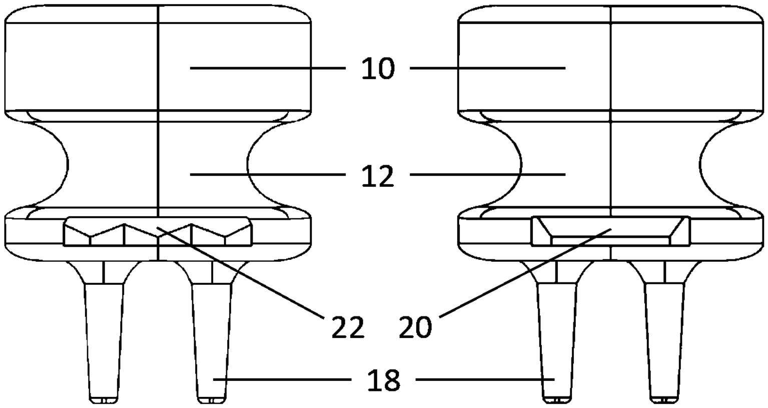
Fig. 5a
Fig. 5b
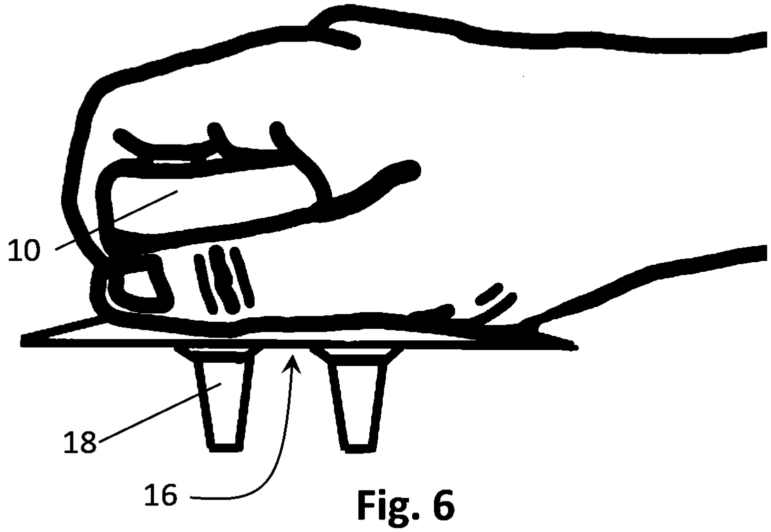
Fig. 6

CLEANING DEVICE FOR ATHLETIC SHOE CLEATS AND SPIKES

CROSS-REFERENCE TO RELATED APPLICATIONS

This application claims the benefit of provisional patent application Ser. No. 62/846,755, filed 2019 May 13, by the present inventor, which is incorporated by reference in its entirety.

BACKGROUND OF THE INVENTION

(1) Field of the Invention

The present invention relates to athletic shoe cleaning, more specifically to a device for removing field debris off the underside of athletic shoes which have cleats or spikes.

(2) Background

Many sports are played on dirt, grass, or artificial turf fields or pitches, or other natural or artificial turf areas. These sports include baseball, softball, football, rugby, lacrosse, field hockey, cricket and golf. In order to best grip the playing surface and have stable footing, athletes of all abilities and levels who play these sports often wear shoes that have some type of protrusions on the bottom called cleats or spikes. These protrusions are of various sizes and configurations, based on the sport and the shoe design. Field debris including dirt, mud, grass, and pebbles which can affix to the shoe bottom and surround the cleats or spikes may interfere with an athlete's ability to perform at his or her best. In addition to diminished performance during play, the mud and dirt remaining on the shoes can be a problem even after the game. Various methods and devices have been put forth to remove field debris from the underside of athletic shoes which have cleats or spikes.

SUMMARY

In accordance with one embodiment, a palm-held device for removing field debris off the underside of athletic shoes which have cleats or spikes, comprises a handle, connected via a neck, to a cleaning platform below which has a plurality of cleaning pegs protruding orthogonally from the base of the cleaning platform and may include one or more additional scrapers on its ends or sides. The cleaning pegs are sized and arranged to accommodate many different shoe designs and cleat or spike shapes, in order for the device to be more universally applicable.

Advantages

Accordingly, several advantages of one or more aspects are as follows: to provide a palm-held device for removing field debris off the underside of athletic shoes which have cleats or spikes which has multiple cleaning elements, that is useful for many different shoe designs and cleat or spike shapes, that is ergonomically designed to be comfortable to grip and use, that allows for the transfer of scraping force directly from the user to the debris on the shoe via the cleaning pegs, that keeps the hands and fingers clean while utilizing it, that avoids potential for injury to the fingers and knuckles by keeping them away from the area being cleaned, that is easily transportable for use at the playing field, that is easily cleaned and stored after use, and that can be manufactured relatively inexpensively in multiple colors. Other advantages of one or more aspects will be apparent from a consideration of the drawings and ensuing description.

BRIEF DESCRIPTION OF THE DRAWINGS

FIGS. 5*a* and 5*b* are end views of the device.

FIG. 6 is a side view of the device showing the proper hand grip during use.

DRAWINGS—REFERENCE NUMERALS

Figure 1:
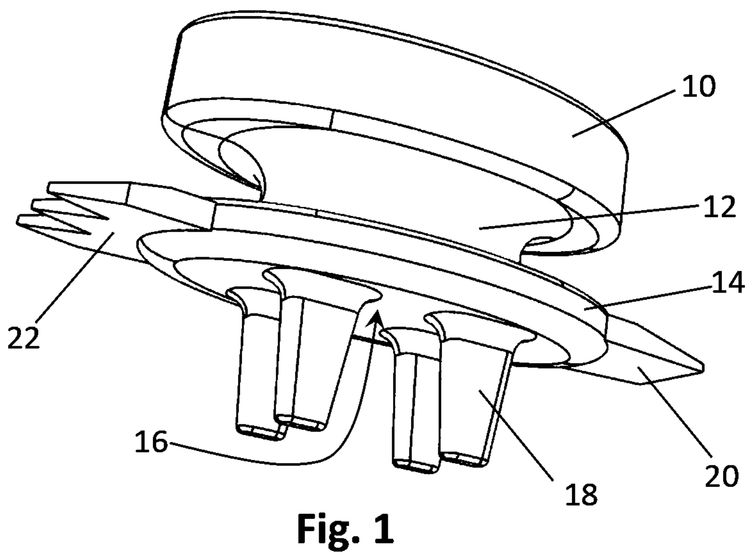
FIG. 1 shows an isometric view of the device identifying parts of the device and illustrating several of the possible cleaning elements.

10 handle 12 neck
14 cleaning platform 16 cleaning platform base
18 cleaning pegs 20 straight scraper
22 serrated scraper 24 handle top
26 device length 28 handle width
30 handle length 32 length between cleaning pegs midpoints
34 width between cleaning pegs midpoints 36 straight scraper width
38 straight scraper length 40 serrated scraper width
42 serrated scraper length 44 device height
46 handle height 48 neck height
50 neck depth 52 cleaning peg height

DETAILED DESCRIPTION—FIGS. 1, 2, 3, 4, 5A and 5B

First Embodiment

One embodiment of the device is illustrated in FIG. 1. The various parts of the device are identified and several of the possible cleaning elements are illustrated. The handle 10 is connected via the neck 12 to the cleaning platform 14. The cleaning pegs 18 are shown protruding from the cleaning platform base 16. Although this embodiment of the device illustrates four cleaning pegs, in practice the number may be more or less, even or odd. Two additional cleaning elements in this embodiment are the straight scraper 20 and the serrated scraper 22.

Figure 2:
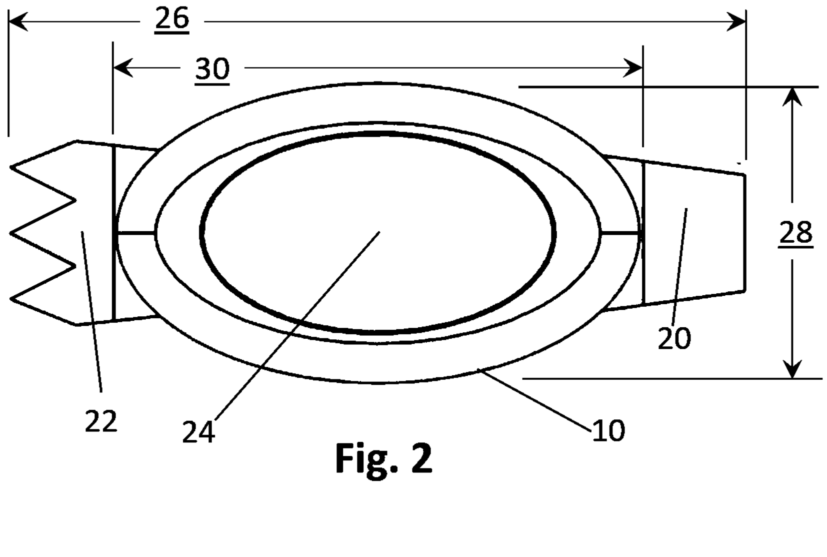
FIG. 2 is a view of the device from the top.

FIG. 2 is a view of the device from the top which provides a better look at the straight scraper 20 and the serrated scraper 22, each of which are depicted as having a tapered shape, along with the handle top 24. In this embodiment, the handle 10 of the device is shown to be an ergonomic oval shape which makes it comfortable to hold and use, although other shapes may be possible. In this embodiment, the overall device length 26 measured from the tip of the serrated scraper 22 to the end of the straight scraper is 13 cm, although it may range between 10 cm to 17 cm. In this embodiment, the overall handle width 28, which encompasses the width of the entire device, is 5 cm, although it may range between 3 cm to 8 cm, and the overall handle length 30 is 10 cm, although it may range between 6 cm to 12 cm to accommodate different hand sizes. There are two cleaning elements shown in this view, although in practice there may be more or less. Referring to the serrated scraper 22, three serrated teeth are shown, although in practice the number of teeth could range from 1 to 10.

Figure 3:
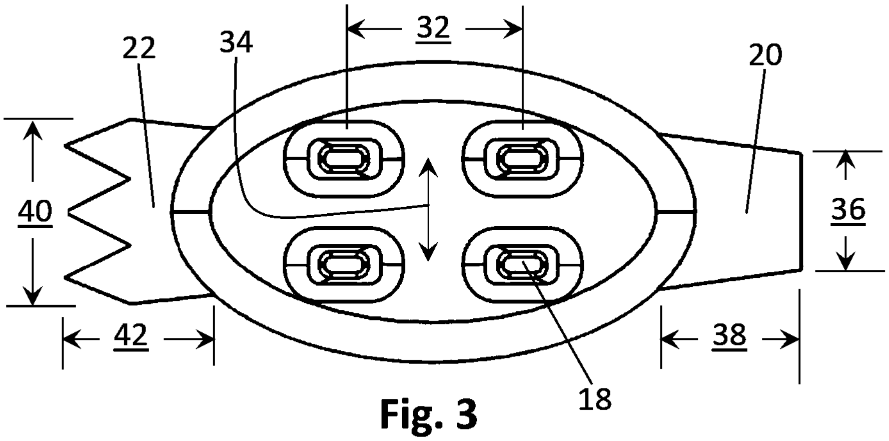
FIG. 3 is a view of the device from the bottom.

FIG. 3 is a view of this embodiment of the device from the bottom, illustrating the bottom of the cleaning pegs 18, straight scraper 20, and serrated scraper 22. As seen in this embodiment, the length between cleaning pegs midpoints 32 and width between cleaning peg midpoints 34 exhibits a rectangular-shape pattern; however, this layout could be in any shape, permitting that the cleaning pegs 18 still clear the height and distance between the cleats or spikes to be useful for a variety of shoe designs and cleat or spike shapes. In addition, the length between cleaning pegs midpoints 32 and width between cleaning peg midpoints 34 must be large enough to avoid significant build-up of field debris between said cleaning pegs 10 during use. In this embodiment, the length between the cleaning pegs midpoints 32 is 2 cm to 5 cm and the width between cleaning pegs midpoints 34 is 2 cm to 5 cm.

In this embodiment, the straight scraper 20 extends outward from the cleaning platform, perpendicular to the cleaning pegs 18. In this embodiment, the straight scraper width 36 is 2 cm, but may range from 1 cm to 4 cm and the straight scraper length 38 is 2 cm, but may range from 1 cm to 4 cm. In this embodiment, the serrated scraper 22 extends outward from the cleaning platform, in the opposite direction of the straight scraper 20, and also perpendicular to the cleaning pegs 18. In this embodiment, the serrated scraper width 40 is 4 cm, but may range from 1 cm to 5 cm and the serrated scraper length 42 is 3 cm, but may range between 1 cm to 4 cm.

Figure 4:
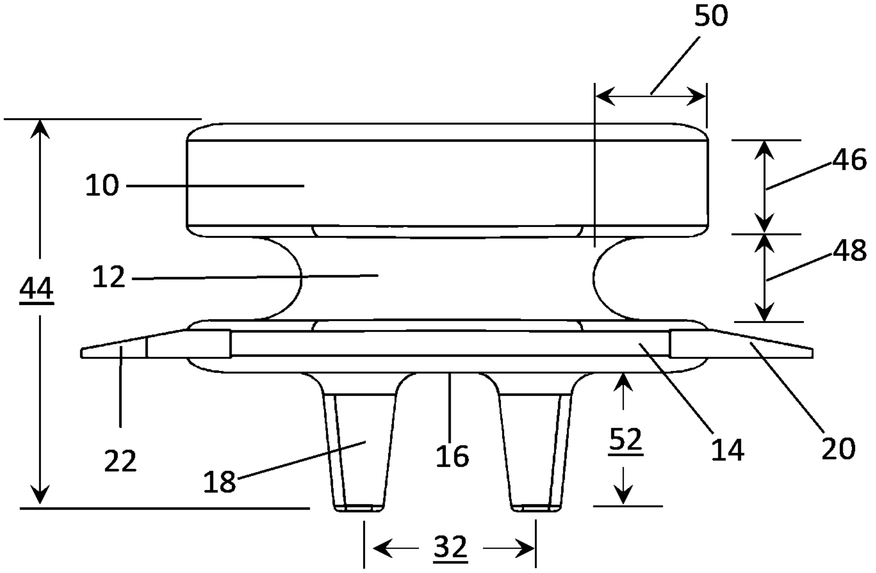
FIG. 4 is a side view of the device.

In FIG. 4, a side view of the device is depicted. In this embodiment, the device height 44, spanning from the end of the cleaning pegs 18 to the top of the handle 10, is 7 cm. However, when applied in practice, this height may range from 5 cm to 9 cm. In this embodiment, the handle height 46 is 1.5 cm. However, when applied in practice, the handle height may range from 1 cm to 4 cm to accommodate different sizes of hands. The neck 12 of the device connects the handle 10 to the cleaning platform 14. The neck height 48 and neck depth 50 are also depicted in FIG. 4. In this embodiment, the neck height 48 is 1.5 cm but may range from 1 cm to 3 cm and the neck depth 50 is 2 cm but may range from 0 cm to 3 cm. This dimension is also a consideration for different sizes of hands.

The height of the cleaning pegs 18 is also depicted in FIG. 4. A consideration for the cleaning peg height 52 is that it must be long enough such that it allows cleats or spikes, from a variety of shoe designs, to pass under the device without hitting the cleaning platform base 16, while still being short enough for an effective scraping force to be applied, through the cleaning pegs 18, to remove the debris from the underside of the shoe. In the current embodiment, the cleaning peg height 52 is 3 cm but may range from 1 cm to 5 cm. In this embodiment, the connection of the cleaning pegs 18 to the cleaning platform 16 is depicted as a fillet to provide additional strength, and the cleaning pegs 18 exhibit a tapered shape. In practice, the connection and the shape could be different.

FIG. 5*a* and FIG. 5*b* are end views of the cleaning assembly. In FIG. 5*a*, the serrated scraper 22 is seen from a head-on view and in FIG. 5*b*, the straight scraper 20 is seen from a head-on view.

In the current embodiment, the device may be fabricated from a variety of materials, with the preferred materials being fairly-high strength engineering polymeric materials, with or without fiber reinforced composites. It would be advantageous for the device to be created from an injection molding and could be done as one piece or multiple pieces that were then fused together. It may also be fabricated using additive manufacturing. It is possible that the handle may be coated in a rubberized material for increased grip and comfort. It is also possible for the device to be made out of more than a single material.

Obviously, many modifications may be made without departing from the basic spirit of the present invention. Accordingly, it will be appreciated by those skilled in the art that within the scope of the appended claims, the invention may be practiced other than has been specifically described herein.

Operation—FIGS. 1 and 6

The palm-held device is used for removing field debris off the underside of athletic shoes which have cleats or spikes. The device can be used either while the shoes are being worn or while they are off the feet. In the current embodiment shown in FIG. 1, it has an oval-shaped, ergonomic handle 10 which is comfortable and easy to hold. FIG. 6 is a side view of the device which depicts the proper hand grip during use. As shown, as the user grips the handle, all parts of the hand are kept above the cleaning platform 14. The user's thumb and fingers are positioned around the neck 12 which avoids hand, finger, or knuckle contact with either the debris or with the cleats or spikes. Larger and smaller sizes of this device may be used for larger and smaller hand sizes.

While tightly gripping the handle 10, the user touches the cleaning pegs 18 to the bottom of the shoe and then uses a repetitive and firm scraping motion to dislodge the field debris. The cleaning pegs 18 should be brought in contact with debris, while ensuring that the cleats or spike on the shoe pass between, or on the side of, the cleaning pegs 18. Having an ergonomic and comfortable grip allows the user to hold the handle tightly in order apply a substantial scraping force directly to the bottom of the shoe, which is especially needed when debris such as mud and dirt is hardened and caked on the shoe. The device can also be used in a repetitive rocking or digging motion to cause the cleaning pegs 18 to dislodge debris located right around the cleats or spikes.

In the current embodiment, the device has two other cleaning elements, in addition to the cleaning pegs 18, which are the straight scraper 20 and the serrated scraper 22. The straight scraper 20 can be used to remove the initial large chunks of dirt and mud before using the cleaning pegs 18. The serrated scraper 22 is useful for digging into caked-on debris, particularly around the base of the cleats or spikes. To use the straight scraper 20, the user grips the handle 10, with the straight scraper 20 facing forward. The user then tips the device at an appropriate angle to contact the straight scraper 20 with the debris on the shoe. To use the serrated scraper 22, the user grips the handle 10, with the serrated scraper 22 facing forward. The user then tips the device at an appropriate angle to contact the serrated scraper 22 with the debris on the shoe and can use a digging or poking motion to loosen the hardened debris.

Additional Embodiments—FIG. 4

An additional embodiment would be that the handle 10, shown in FIG. 4, could be made in more than one piece, such that a cap on the handle could be removed exposing a hollow storage cavity. This cavity could be used to house items, such as money, keys, or other items for safe keeping while at the playing field. It could also be used to house a carrying pouch for the device. After device use, the pouch would be removed from the cavity and then used to store the device.

Advantages

From the description above, a number of advantages of some embodiments of my device become evident:

(a) The palm-held device is useful for removing field debris from many different athletic shoes types which may have different cleat or spike shapes and sizes.

(b) The device can be used both while the athlete has the shoe on his or her foot (such as during a break in a game) to clear away the field debris which builds up on the shoe, or when holding the shoe without being on the foot.

(c) The device is ergonomically designed to be comfortable to grip and use. The handle is positioned vertically above the cleaning platform, such that the planes of those two features are parallel, and both are orthogonal to the main cleaning pegs. This design allows for the transfer of force directly from the user to the debris on the shoe, through the cleaning pegs. A firm strong grip and scraping motion effectively removes the debris.

(d) In addition, positioning the handle directly on top of the device also keeps all parts of the hands clean and avoids potential for injury to the fingers and knuckles caused by impact with cleats or spikes as the scraping motion is applied across the length of the shoe. Using other cleaning devices, in which the handle is at the end of the device, often results in injury of the fingers and knuckles by impact with the cleats or spikes, and also allows the hand to get soiled by the debris, as the scraping motion is applied across the length of the shoe.

(e) Consolidating the main features of the device to align on a single axis, by positioning the handle above the main cleaning pegs, also enables the overall size of the device to be compact and therefore more easily transportable for use at the playing field. The device is easily stored in a pouch and then stowed in a sports bag or in the car.

(f) The device can be made with or more different cleaning implements. In addition to having a plurality of cleaning pegs protruding orthogonally from the base of the cleaning platform, additional scrapers on opposite sides can also be incorporated into the design, as shown in the depicted embodiment.

(g) The device is easily manufactured by injection molding or additive manufacturing out of a lightweight, but relatively strong, material. It can be manufactured relatively inexpensively and could be produced in one or more colors.

(h) Removing the dirt from around the cleats not only helps maintain performance of the athlete on the field but also keeps dirt from messing up other equipment or gear in a sports bag and from getting mud and dirt in a car or house, particularly by younger athletes who often wear their shoes with rubber cleats home from the field.

CONCLUSION, RAMIFICATIONS, AND SCOPE

The reader will see that at least one embodiment of my device for removing field debris off the underside of athletic shoes which have cleats or spikes, provides an economical, lightweight, palm-held ergonomic cleaning assembly that can be used by athletes of any age.

While my above description contains many specificities, these should not be construed as limitations on the scope, but rather as an exemplification of one more embodiments thereof. Other variations are possible.

Thus the scope of the embodiments should be determined by the appended claims and their legal equivalents, rather than by the examples given.

I claim:

1. A palm-held device for cleaning field debris off the underside of athletic shoes which have cleats or spikes, the device comprising:

a handle comprising a substantially planar top surface with an oval profile configured to fit in a palm of a user, the oval being centered over a central axis;

a cleaning platform comprising the same or substantially the same planar shape and profile as the handle along the central axis and having four (4) tapered cleaning pegs arranged in two (2) rows and two (2) columns protruding from a bottom surface of the cleaning platform in the same direction as the central axis and away from the handle, the cleaning pegs tapering from to a narrower profile away from the cleaning platform, the cleaning pegs are configured such that the user can apply a direct force from its palm to the cleaning pegs to remove the debris from the underside of the athletic shoe;

a neck running along the central axis and connecting a bottom surface of the handle to a top surface of the cleaning platform, the neck being of a smaller profile along the central axis than both the handle and the cleaning platform;

a straight scraper extending outward from first side of the cleaning platform; and a serrated scraper extending outward from a second side of the cleaning platform, the second side being opposite of the first side of the cleaning platform;

wherein the handle, the cleaning platform, the neck, the straight scraper, and the serrated scraper are integrally formed from a single piece of material.

2. The palm-held device of claim 1, wherein the plurality of cleaning pegs are substantially equally spaced about the cleaning platform.

3. The palm-held device of claim 1, wherein the cleaning pegs are spaced apart from each other to accommodate use on a variety of cleat or spike shapes.

4. The palm-held device of claim 1, wherein the cleaning pegs are spaced apart from each other to avoid build-up of field debris between the cleaning pegs during use.

5. The palm-held device of claim 1, wherein the palm-held device is manufactured by injection molding.

6. The palm-held device of claim 1, wherein the cleaning pegs are configured to allow a plurality of cleats or spikes to pass under the device during use without the bottom of the cleaning platform hitting the cleats or spikes, while the cleaning pegs remove the debris from the underside of the athletic shoe.

7. The palm-held device of claim 1, wherein the size of the neck permits a user's thumb and fingers to be positioned around the neck while gripping the handle, thereby avoiding hand contact with cleats or spikes as the user scrapes the pegs across the underside of the athletic shoe.

* * * * *